US006883569B2

(12) United States Patent
Deal et al.

(10) Patent No.: US 6,883,569 B2
(45) Date of Patent: Apr. 26, 2005

(54) ASSEMBLY COMPRISING A TIRE, A COLLAR AND A WHEEL RIM

(75) Inventors: Michel Deal, St-Remy-en-Rollat (FR); Luc Bestgen, Chatel-Guyon (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 10/643,950

(22) Filed: Aug. 20, 2003

(65) Prior Publication Data

US 2004/0031549 A1 Feb. 19, 2004

Related U.S. Application Data

(63) Continuation of application No. PCT/EP02/01577, filed on Feb. 14, 2002.

(30) Foreign Application Priority Data

Feb. 26, 2001 (FR) .............................................. 01 02685

(51) Int. Cl.$^7$ .............................................. B60B 25/08
(52) U.S. Cl. ................................ 152/381.4; 152/379.4; 301/10.1
(58) Field of Search .............................. 301/10.1, 11.1, 301/64.301, 64.304, 64.702, 64.703, 64.706, 95.102, 95.107; 152/375, 379.3, 379.4, 379.5, 381.4, 381.5, 394, 396, 399, 400, 403, 405

(56) References Cited

U.S. PATENT DOCUMENTS

| | | | | | |
|---|---|---|---|---|---|
| 1,788,431 A | * | 1/1931 | Goodyear et al. | ...... | 301/64.304 |
| 4,422,490 A | * | 12/1983 | Power | ......................... | 152/394 |
| 4,440,209 A | * | 4/1984 | Grob | ........................... | 152/397 |
| 4,682,640 A | * | 7/1987 | Berger et al. | ................ | 152/405 |
| 4,930,558 A | * | 6/1990 | Sahagian | .................. | 152/339.1 |
| 6,554,036 B1 | * | 4/2003 | Deal | ............................ | 152/514 |
| 6,626,217 B2 | * | 9/2003 | Bestgen | ................... | 152/379.4 |

FOREIGN PATENT DOCUMENTS

| | | |
|---|---|---|
| DE | 3337326 A1 | 4/1985 |
| FR | 2 773 745 A | 7/1999 |
| GB | 794779 A | 7/1958 |
| JP | 59063202 A | 4/1984 |
| WO | WO 00/78565 A1 * | 12/2000 |

* cited by examiner

Primary Examiner—Russell D. Stormer
(74) Attorney, Agent, or Firm—Burns, Doane, Swecker & Mathis, L.L.P.

(57) ABSTRACT

A rolling assembly includes a rim and a unit that can be slid axially onto and off the rim. The unit includes the tire and a collar on which the tire is mounted. The collar includes opposite collar hooks interconnected by a reinforced central portion of the collar. The hooks receive respective tire beads. When the tire is at reduced pressure, the unit can be inserted onto the rim. Upon inflation of the tire, a blocking portion of the tire enters a groove of the rim to axially lock the tire onto the rim.

4 Claims, 2 Drawing Sheets

ASSEMBLY COMPRISING A TIRE, A COLLAR AND A WHEEL RIM

This application is a Continuation of Application No. PCT/EP02/01577 filed on Feb. 14, 2002.

BACKGROUND

The invention concerns a rolling assembly consisting of a tire and a wheel, the wheel comprising at least one collar that ensures connection between a substantially cylindrical wheel rim and the tire.

Most known tire-wheel assemblies are so constructed that the wheel can be taken off the vehicle to which it is fitted, the tire then being removed from the wheel by a workshop operation using appropriate machinery. A usual wheel comprises inter alia a rim which, depending on the vehicle and the assembly considered, may be made in one or more parts. The fitting of a tire, which consists in positioning the tire beads correctly on the seats and against the flanges of a rim, is not an easy operation even for a specialist and all the more so for a normal user, and does not always lead to the expected results: correct position, perfect airtightness, sufficient grip against the seat, etc. The same applies to the removal of the tire, which requires effort and care beyond the ability of the average driver. To simplify the operations of fitting and removing a tire, that is to say, to obviate the need for special machinery and considerable knowledge, a method has been proposed which consists in fitting the tire onto a cylindrical or substantially cylindrical support, a support which will be referred to by extension of the term as the rim, simply by virtue of a transverse relative movement between the rim and the tire. Clearly, the implementation of the method requires a third element.

For civil engineering equipment, patent FR 2 087 770 describes beads provided on their bearing surfaces with one or more annular metallic components fixed permanently on the beads, the components acting as wheel rim seats and being designed to rest on a cylindrical support attached to the vehicle being equipped and playing the part of a rim base or rim. The above third element is then the assembly of the metallic components that make it possible to slide the try-seat assembly onto the support, so ensuring easier fitting and removal.

For smaller tires with the usual structures, i.e. ones with at least one carcass reinforcement and a tread connected to two beads by two sidewalls, patent FR 2 773 745 describes an assembly comprising the said tire, a substantially cylindrical support or rim and a third element consisting of a collar or adaptor specifically developed to be associated with the tire and to constitute a sub-assembly having the desired fitting and removal properties. The collar, whose axial width is essentially equal to the width of the support or rim, is intended to be fitted under the beads of the tire of ordinary structure and comprises two seats to receive the beads. Together with the tire it forms a closed torus that defines an airtight tire chamber, and constitutes the radially inside wall of the torus. It comprises a blocking means to immobilize the tire axially on the rim; the said means are formed on the radially inside face, are designed to co-operate with a complementary element formed on the rim to oppose any axial movement between the rim and tire, and are formed in a part of the collar that shows a certain degree of flexibility between a natural, free position and a position stressed radially outwards in which the blocking means are free from any engagement with the complementary element. When the airtight chamber is at the same pressure as the atmospheric pressure, the blocking means are engaged with the complementary element so as to lock the tire axially, and can only be released by the imposition of external means. According to the invention described, the operations of fitting and removal entail that the pressure in the chamber formed by the tire and the collar is reduced, this underpressure causing most of the collar to increase in diameter and therefore allowing the tire to fit easily onto the rim, the tire then being immobilized by engagement of the blocking means once the pressure has been restored. During removal, the production of an underpressure in the airtight chamber allows the blocking means to increase their diameter so that the tire can slide off the rim. In a general sense the blocking means advantageously consist of a protuberance or groove on the collar associated with a matching groove or protuberance on the rim. By an appropriate choice of the materials, design and dimensions of the collar, it is very easily possible to confer on most of the axial portion of the said collar the flexibility required for the deformations desired.

A collar made from a reinforced elastomeric material, having on each side of its equatorial plane an edge designed to receive a tire bead, the edge being reinforced mainly by a metallic spring, and having between the two edges thereof a central part comprising the blocking means and reinforced by a ply of radial reinforcement elements has the following disadvantages when the dimensional variations of tire beads are taken into account: the occurrence of excessive friction of the edges of the collar against the rim during fitting, and the occurrence of not inconsiderable slippage between the radially inside face of the collar and the radially upper face of the rim during the use of the rolling system, which lead to unacceptable wear of the collar and the rim and to excessive deformation of the radial reinforcement elements, this deformation being harmful in relation to the desired endurance.

SUMMARY OF THE INVENTION

To overcome these disadvantages, the rolling assembly according to the present invention, which comprises a tire with at least two beads, a substantially cylindrical rim, a collar made from a polymeric material and having two axial edges each reinforced by at least one ring, with a central potion between the said edges reinforced by at least one armature of reinforcement elements such that the central portion will be sufficiently flexible to allow the radial displacement of a blocking element that acts in concert with a complementary element of the same name of the rim with axial width W, is characterized in that the reinforcement of each edge of the collar is a collar hook with a seat and a flange, the hooks, seats and flanges being similar to the hooks, seats and flanges of a rim with radial and axial dimensions in accordance with the standards in force, the width of the rim being smaller than the axial distance separating the axially inside ends of the collar seats. The reinforcement of the collar edges by rigid hooks of standard type for the usual rims enable tires to be fitted allowing for the dimensional variations of the beads that are observed depending on the models or makes. Thus, fitting the tire/collar sub-assembly onto the rim is guaranteed to be a simple process requiring no special tools and with no risk that the tire/collar sub-assembly will have a diameter smaller than that of the rim in the areas of the collar hooks.

The wear phenomena between the collar and the rim can be very greatly minimized or prevented entirely if the central portion of the collar has a certain hooping ability conferred upon it by the reinforcement by virtue of an armature comprising at least two plies of reinforcement elements, these being parallel to one another within each ply and crossed over from one ply to the next so that they make angles that can range from 300 to 650 relative to the circumferential direction of the collar.

The circumferential hooping of the central portion is advantageously greater at the edges of the central portion: thus, each part of the collar opposite the edges of the rim can be reinforced by an additional strip of circumferential reinforcement elements, the elements being preferably made of an aliphatic polyamide that contracts under the action of heat.

The angles chosen for the reinforcement elements of the collar, which are different from 90°, enable the reinforcement elements to be more fatigue resistant since they are not subjected to repeated edge flexure.

BRIEF DESCRIPTION OF THE DRAWING

The invention will be better understood with the help of the description given below of a non-limiting example, wherein.

DETAILED DESCRIPTION OF A PREFERRED EMBODIMENT

Figure 1:
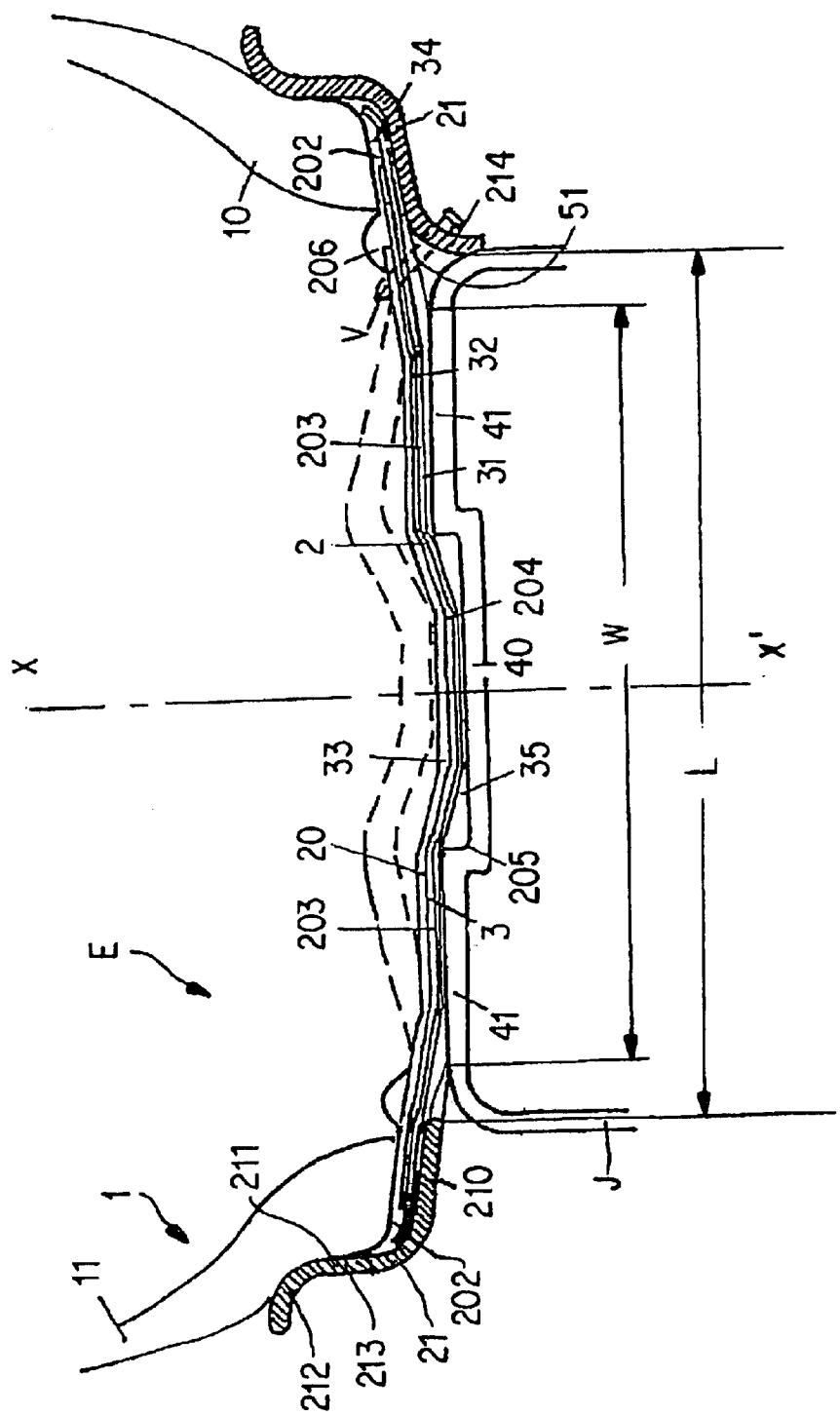
FIG. 1 shows a schematic representation of an assembly according to the invention.
Figure 2:
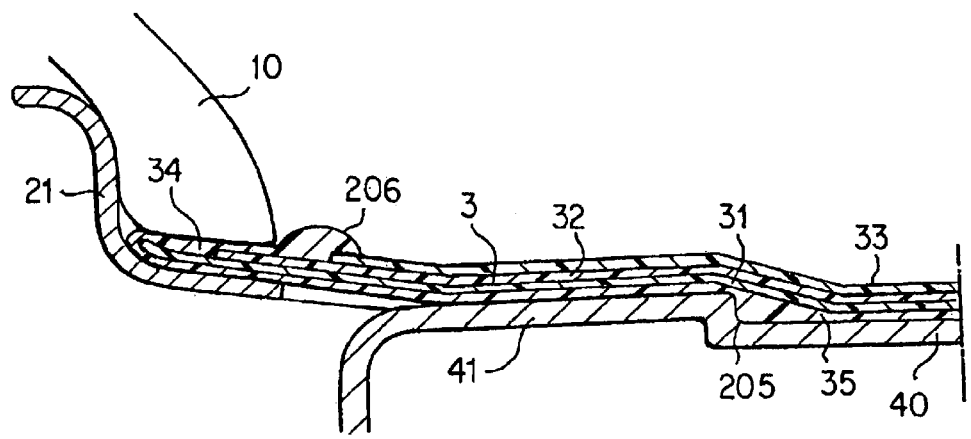
FIG. 2 is an enlarged cross-hatched view of the left-hand side of FIG. 1.
Figure 3:
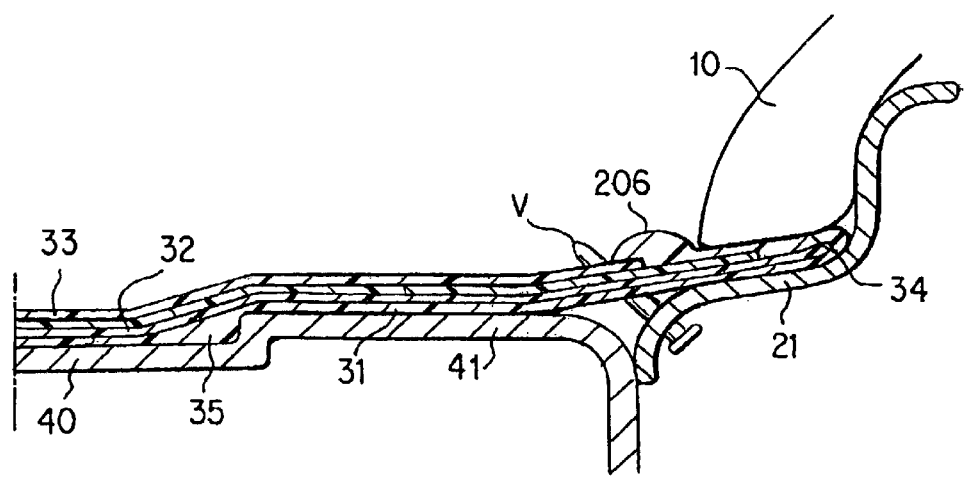
FIG. 3 is an enlarged cross-hatched view of the right-hand side of FIG. 1.

The assembly E in FIG. 1 consists of a tire 1, a rim J and an elastomeric collar 2; XX' represents the trace of the median plane of the assembly E. As known in its own right, the tire 1 comprises a carcass reinforcement radially covered by a crown reinforcement and by a tread (the reinforcements and the tread are not shown), connected to two beads 10 by means of two sidewalls 11.

The beads 10 of the tire 1 are designed to be fitted on two metallic hooks 21 of the collar 2, the hooks being entirely comparable to those of the usual, known wheel rims, i.e. hooks formed of a seat 210 which may be flat and/or frustoconical, and of a radially projecting flange 211 that can be characterized by the addition of a part 213 perpendicular to the rotation axis of the assembly E and a rounded part 212.

The hooks 21 are on the one hand radially attached and on the other hand axially connected by the polymeric central portion 20 of the collar 2. The portion 20 extends axially continuously from one hook 21 to the other and includes two end parts 202 designed to come into contact with the seats 210 of the hooks 21 of the collar 2, extended axially by two cylindrical portions 203 designed to come into contact with the corresponding cylindrical parts 41 of the rim J of the assembly E, the portions 203 being connected axially by a blocking element 204 of the collar 2. The element 204 is in the form of a protuberance on each side of which is a circumferentially continuous blocking bearing surface 205 orientated, in the case described, perpendicularly to the rotation axis of the assembly. The radially outside face of the collar 2 is axially shaped essentially parallel to its radially inside face; however, the portion 202 and the cylindrical portion 203 are axially connected by the upper face of a protrusion or hump 206 of shape and dimensions similar to those of the protrusions or humps standardized for ordinary rims.

The polymeric portion of the collar 2 consists of a reinforcement armature 3 formed of two plies 31 and 32 of metallic steel cables parallel to one another within each ply, crossed over from one ply to the next and forming an angle of 45° with the circumferential direction, and embedded in a vulcanized rubber mixture. The plies 31 and 32 are wide enough to cover the two collar seats 210, ending at the rounded portions that connect the seats 210 and the flanges 211. Over its portion between the seats 210 and radially on the outside, the armature 3 is covered by a layer 33 of rubber mixture impermeable to gases, while radially on the inside it is covered in the portions 202 by a protective layer 34 of rubber mixture. "Layer of rubber mixture impermeable to gases" means a layer of known composition similar to the layer of rubber mixture customarily used on the inside of so-termed "tubeless" tires, or one of equivalent constitution. Similarly, "protective layer of rubber mixture" means a layer of rubber mixture of known composition similar to the layer customarily applied for the protection of tire beads, or one of equivalent constitution. On the radially lower face and in the part between the seats 210 of the collar 2 is arranged a protective layer 35 identical to the above protective layer and mainly intended to come into contact with the rim J.

As for the mounting rim J, this is in the form of a cylinder with a surface comprising two cylindrical portions 41 and, between the said portions 41, a circumferentially continuous groove 40 designed to act as the complementary blocking element and having dimensions matched to those of the element 204 of the collar 2. With a blocking bearing surface 205 on each side, the element 204 co-operates with the groove 40 to prevent any axial displacement of the collar 2 and the tire 1 relative to the rim J when the tire is inflated to its recommended pressure and during rolling. The width of contact between the tire and the rim J is W, where W can be between the axial distance L separating the inner ends of the seats 210 and 60% of this distance L, such that contact between the metal of the seats and the metal of the rim is avoided.

As explained in the patent application cited earlier, to which reference should be made, the process of fitting the tire 1 mounted on its collar 2 so as to form an airtight chamber comprises the following stages:

the pressure in the chamber is reduced until the blocking element 204 is displaced sufficiently towards the larger radius (indicated schematically by the broken lines in FIG. 1);

the tire-collar assembly or unit is pushed or made to move axially onto the mounting rim J until it reaches its final axial position relative to the rim;

the reduced pressure is increased again so that the blocking element moves radially towards a smaller radius and locates itself within the groove 40.

The process of removing the tire/collar assembly comprises the same stages, namely reduction of the pressure and axial displacement. Reducing the pressure in the chamber suffices to bring about the radial displacement of the elastomeric portion of the collar 2, but without affecting the other components of the tire 1.

It is clear that reducing and later restoring the pressure in the tire chamber necessitates the presence of an inflation valve V, which is represented very schematically in FIG. 1. The valve body 51 is positioned through an orifice in the radial appendage 214 that extends one of the seats 210 of the collar 2 axially and radially, the body having its outlet orifice located essentially near the axially inside face of the protrusion 206 of the upper face of the collar 2.

What is claimed is:

1. Rolling assembly comprising a tire with two beads, a substantially cylindrical rim, a collar comprising a polymeric central portion with two axial edges each reinforced by at least one ring, and between the edges, the central portion including an armature of reinforcement elements such that the central portion is sufficiently flexible to allow the radial displacement of a first blocking element of the central portion into and out of engagement with a second blocking element of the rim to axially lock the tire to the rim, one of the first and second blocking elements comprising a groove into which the other of the first and second blocking elements is received, wherein the reinforcement of each edge of the collar comprises a collar hook with a seat and a flange, an axial contact width defined by contact between the tire and the rim being smaller than an axial distance separating axially inside ends of the seats of the collar, the central portion of the collar extending continuously from one collar hook to the other, wherein the tire and the collar are arranged to be inserted as a unit over the rim in one axial direction when the tire is at reduced pressure.

2. Assembly according to claim 1, in which comprising a plurality of plies of reinforcement elements embedded in a vulcanized rubber mixture.

3. Assembly according to claim 2, in which each portion of the collar opposite respective edges of the rim is additionally reinforced by a supplementary strip of circumferential reinforcement elements, the elements being of an aliphatic polyamide which contracts under the action of heat.

4. A rolling assembly defining an axis of rotation and comprising a tire, a rim, and a collar;

the tire including two axially spaced beads;

the rim including a radially outwardly facing rim surface extending between opposite axial sides of the rim, a portion of the rim surface including a circumferentially extending groove;

the collar comprising:
   a pair of axially spaced rigid collar hooks in which respective tire beads are received, each collar hook including a seat and a radially projecting flange, and
   a flexible central portion comprised of a polymeric material and extending continuously circumferentially around the rim surface and extending continuously axially between the collar hooks, wherein opposite axial edges of the central portion are received in respective seats of the collar hooks, the central portion including a reinforcement armature, a blocking portion of the central portion being spaced from both of the axial edges and projecting into the groove of the rim surface when the tire is fully pressurized;

an axial contact width defined by contact between the tire and the rim being smaller than an axial distance separating axially inside ends of the seats of the collar;

wherein the tire and the collar are arranged to be inserted as a unit over the rim surface in one axial direction when the tire is at reduced pressure.

* * * * *